United States Patent [19]

Schiller

[11] 4,411,292
[45] Oct. 25, 1983

[54] FLUID FLOW RESTRICTOR DEVICE

[76] Inventor: Arminio Schiller, 15 Hamatmid St., Ramat Gan, Israel

[21] Appl. No.: 325,732

[22] Filed: Nov. 30, 1981

[51] Int. Cl.³ .............................................. F15D 1/02
[52] U.S. Cl. ...................................... 138/42; 62/511; 604/251
[58] Field of Search ...................... 62/511; 138/41, 42, 138/40, 43; 239/542; 251/126; 604/246, 251–256; 73/861.52, 861.59

[56] References Cited

U.S. PATENT DOCUMENTS

| | | | |
|---|---|---|---|
| 2,025,396 | 12/1935 | MacIndoe | 138/42 |
| 2,146,823 | 2/1939 | Karmazin | 138/42 |
| 2,623,577 | 12/1952 | Cowles | 138/42 X |
| 2,683,973 | 7/1954 | Mettler | 138/42 X |

Primary Examiner—Stephen Marcus
Assistant Examiner—Mark Thronson
Attorney, Agent, or Firm—Benjamin J. Barish

[57] ABSTRACT

A fluid flow restrictor device, capable of producing a precise rate of fluid flow, comprises a closed spiral coil of wire contacted on at least one face by a member so as to define therewith a spiral passageway of precise cross-section, there being a fluid inlet at one end of the spiral passageway and a fluid outlet at the other end. In several preferred embodiments of the invention described, the closed spiral coil of wire is disposed between an inner member in contact with the inner face of the coil, and an outer member in contact with the outer face of the coil, one of the members closing the spiral passageway between it and the respective face of the coil, thereby leaving the other spiral passageway for conducting the fluid. At least one of the members is resiliently deformable to increase the cross-sectional area of the passageway to permit flushing the device.

10 Claims, 8 Drawing Figures

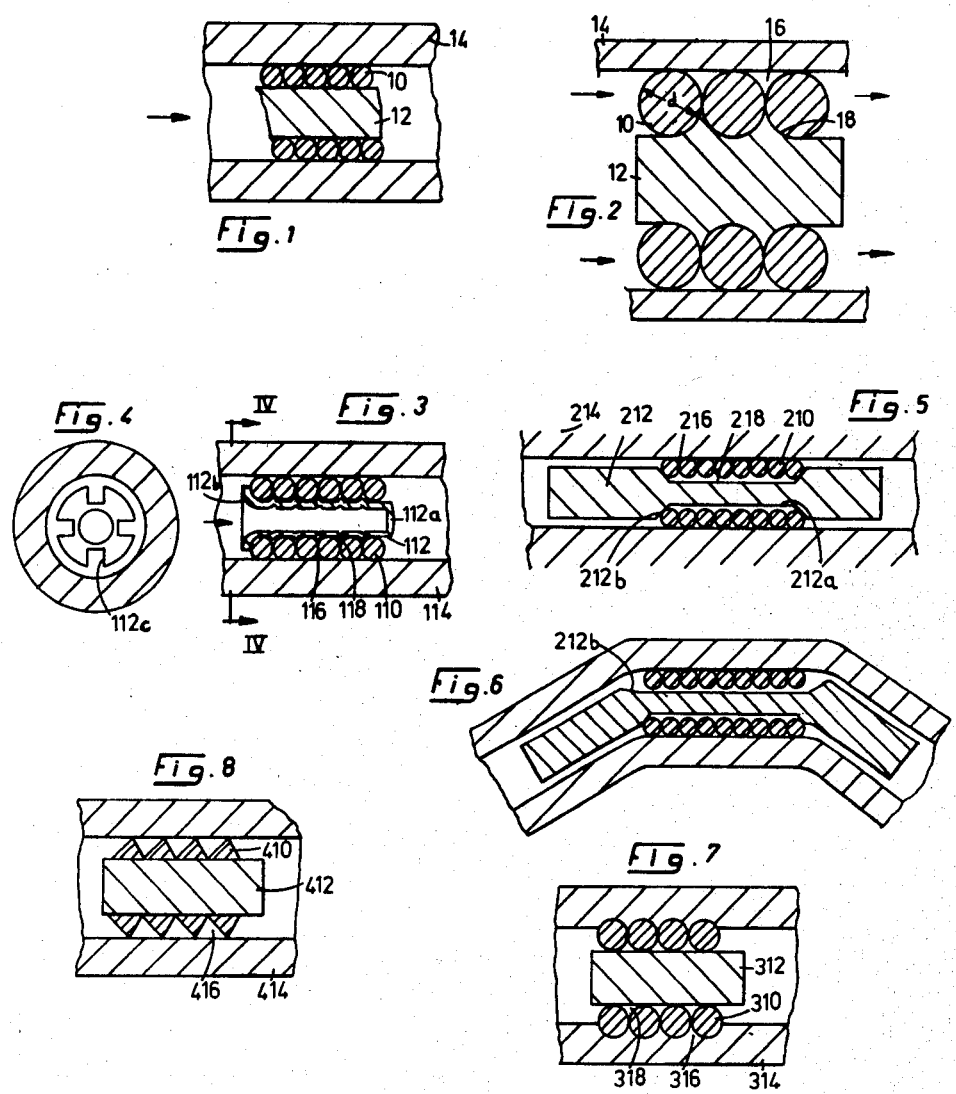

FLUID FLOW RESTRICTOR DEVICE

BACKGROUND OF THE INVENTION

The present invention relates to a fluid-flow restrictor device, and particularly to one producing precise rates of restricted fluid flow. Such devices are used in a wide variety of applications, including drip-irrigation systems wherein irrigation water is supplied continuously at a low rate directly to the root region of the plants, refrigeration systems wherein controlled pressure drops are produced in a refrigerant gas, and medical applications wherein the flow of various fluids is precisely controlled.

Several techniques are used for restricting fluid flow in the known devices. Thus, one technique is to provide a small metering opening which restricts the fluid flow to a precisely metered rate; such devices, however, are very expensive to produce to obtain high accuracy, and moreover they have a very high sensitivity to clogging. Another type of device includes an elongated circuitous pathway, such as a spiral groove or a labyrinth, but even though such devices have a lower sensitivity to clogging, they also tend to have low accuracy, particularly when mass-produced. High-accuracy, for example in the order of microns, is very expensive to attain and difficult to reproduce in mass production in both types of devices. In addition, both types of devices usually require disassembly of their parts in order to permit cleaning of clogging particles, which is frequently not only inconvenient to do, but also increases the downtime of the system in which the devices are used.

An object of the present invention is to provide a fluid flow restrictor device having advantages in some or all of the above respects.

BRIEF SUMMARY OF THE INVENTION

According to a broad aspect of the present invention, there is provided a fluid flow restrictor device including a spiral passageway defined by a closed spiral coil of wire disposed between an inner member contacting the inner face of the coil and an outer member contacting the outer face of the coil, there being a fluid inlet at one end of the spiral passageway and a fluid outlet at the other end of the spiral passageway. The coil spirals are in contact with each other and are unbonded to each other such that they define with at least one of said members a spiral passageway of precise cross-sectional area. In addition, at least one of the members is resiliently deformable to increase the cross-sectional area of the passageway and thereby to permit flushing the device.

Such restrictor devices can be constructed at very low expense and with very high precision using the existing techniques of drawing wire, for example in making metal springs. The spiral passageway defined by the closed spiral coil and the member contacting its respective face is of precise cross-section, being defined by the following relationship:

$$A = d^2(4-\pi)/8$$

wherein "A" is the cross-sectional area of the spiral passageway, and "d" is the diameter of the wire forming the closed spiral coil (assuming the wire is of circular cross-section). Since wire can be drawn to any predetermined diameter "d" very inexpensively and with very high accuracy, in the order of microns, it follows therefore that a precise cross-sectional area "A" can be attained inexpensively and with repeatability in mass production.

In the preferred embodiments of the invention described below, one member closes the spiral passageway between it and the respective face of the coil, whereby the spiral passageway of precise cross-sectional area is defined by the other member and the other face of the coil.

In one described embodiment, the inner member comprises an inflatable hollow sleeve closed at one end and open at the opposite end to permit inflation of the sleeve and thereby deformation of its outer face into the inner spiral passageway to close same, deflation of the sleeve opening both of said spiral passageways permitting flushing of the device of any clogging particles.

Another embodiment of the invention is described wherein the deformable member is the inner member and includes a solid core of resilient material. This member is formed with an annular recess portion for receiving said closed spiral coil, the end faces bounding said recess portion contacting the ends of the spiral coil to close the passageway between the inner face of the coil and the outer face of the core. In the described embodiment, the outer member is in the form of a sleeve which is bendable with the inner core to move said end faces bounding the recessed portion of the inner core out of contact with the ends of the spiral coil, to thereby open both of said passageways permitting flushing of the device of any clogging particles.

The closed spiral coil may be of metal wire of circular cross-section as commonly used for making coil springs. However, the spiral coil could also be of plastic wire, and may be of other cross-section, for example triangular cross-section.

Other features and advantages of the invention will be apparent from the description below.

BRIEF DESCRIPTION OF THE DRAWINGS

The invention is herein described, by way of example only, with reference to the accompanying drawings, wherein:

FIG. 1 is a sectional view illustrating one form of fluid flow restrictor device constructed in accordance with the invention;

FIG. 2 is an enlarged fragmentary view of the device of FIG. 1;

FIG. 3 illustrates a second form of fluid-flow restrictor device constructed in accordance with the invention;

FIG. 4 is an end view of the device of FIG. 3;

FIG. 5 is a sectional view illustrating another fluid-flow restrictor device constructed in accordance with the invention, the device being shown in its normal operating condition;

FIG. 6 is a sectional view illustrating the device of FIG. 5 deformed so as to permit flushing of any clogging particles;

FIG. 7 illustrates a still further form of fluid-flow restrictor device, similar to that of FIG. 1 except that the outer member is the deformable one to close-off the outer spiral passageway; and FIG. 8 illustrates a still further form of fluid-flow restrictor device wherein the closed spiral coil of wire is of triangular cross-section rather than of circular cross-section.

DESCRIPTION OF PREFERRED EMBODIMENTS

With reference to FIGS. 1 and 2, there is shown a fluid-flow restrictor device comprising, broadly, a closed spiral coil 10 of wire disposed between an inner solid core 12 in contact with the inner face of the coil, and an outer sleeve 14 in contact with the outer face of the coil. The outer sleeve 14 is substantially non-deformable in a radial direction so that its inner face, in contact with the outer face of the coil 10, defines a spiral passageway 16 (FIG. 2) following the spiral of the coil wire. The inner core 12, however, is deformable in the radial direction, as shown at 18 in FIG. 2, so that it closes-off the corresponding spiral passageawy that would have been formed between it and the inner face of the coil 10 had the core 12 been non-deformable in the radial direction.

As indicated above, when the wire of coil 10 is of circular section, the cross-sectional area "A" of the spiral passageway 16 is related to the diameter (d) of the wire of coil 10 according to the following relationship:

$$A = d^2(4-\pi)/8$$

The fluid, which may be a liquid or a gas, is inletted at one end (e.g. the left end in FIGS. 1 and 2), flows through the spiral passageway 16 between the outer face of coil 10 and the inner face of sleeve 14, and exits from the opposite end of the coil. The rate of flow of the fluid through passageway 16 is therefore dependent, in addition to other factors such as pressure and viscosity, on the cross-sectional area of the spiral passageway 16. Since wires can be drawn inexpensively with very high tolerance, e.g. in the order of microns (for example in the manufacture of coil springs), it is thus seen that the cross-sectional area of passageway 16, and therefore the flow rate through the restrictor, can be designed with great precision, at low cost, and with a high degree of reproduceability in mass-production. As indicated below, one manner of flushing the device is to longitudinally compress the outer sleeve 14, which causes it to increase its internal diameter thereby permitting flushing of the spiral passageway.

FIGS. 3 and 4 illustrate a fluid flow restrictor device of similar construction but including an inflatable sleeve, generally designated 112, serving as the inner member in contact with the inner face of the closed spiral coil 110. As in FIGS. 1 and 2, however, the outer member in contact with the outer face of the coil 110 is in the form of a sleeve 114 non-deformable in the radial direction.

The inner inflatable sleeve 112 is closed at one end 112a and is formed with an annular flange 112b at its opposite open end. The sleeve itself is made of sufficiently resilient material so that, upon application of a pressurized fluid through its open end, it deforms radially to enter the space 118 along the inner face of the coil 110 and thereby to close-off the spiral passageway that would otherwise be formed between it and the inner face of the coil. This leaves the spiral passageway 116 between the outer face of the coil 110, and the inner face of the outer sleeve 114, as the restricted-flow passageway for the fluid.

The annular flange 112b at the open end of sleeve 112 is sufficiently rigid so that it prevents the longitudinal displacement of the sleeve 112 within coil 110 upon the application of the pressurized fluid to inflate the sleeve. Flange 112b is preferably formed with one or more openings 112c (four being shown in FIG. 4) so that when sleeve 112 is deflated, the fluid may flow between sleeve 112 and the inner face of the coil 110, as well as between the outer face of the coil and sleeve 114, for flushing the device of any clogging particles, as described below.

The device illustrated in FIGS. 3 and 4 may be used in the following manner: During normal use, the inflatable sleeve 112 is designed so that under normal pressure the sleeve is inflated to deform radially against the inner face of coil 110 and thereby closes off the spiral passageway 118 between it and the inner face of the coil. This permits the fluid to flow only through the spiral passageway 116 between the outer face of the coil and the outer sleeve 114. Whenever it is desired to flush the device of any clogging particles, the fluid pressure is reduced to deflate sleeve 112 out of contact with coil 110, thereby permitting a larger quantity of the fluid to flow not only through the spiral passageway 116, but also through the inner spiral passageway 118, the fluid to the latter passageway entering via openings 112c in the annular flange 112b of the sleeve.

FIGS. 5 and 6 illustrate another construction of restrictor device that may be used, this construction also including the three main elements, namely a closed spiral coil 210 of wire disposed between an inner member 212 and an outer member 214. In this case, the inner member 212 is a solid core but is formed with an annular groove 212a having an axial length equal to the length of the spiral coil 210 so that the end faces 212b bounding groove 212a engage the ends of the coil. Preferably, the end faces 212b of groove 212a are slanted and are deformable so as to effect a good sealing contact with the ends of the coil in the normal operation of the device. The inner core 212 and the outer sleeve 214 need not otherwise be deformable in the radial direction, but should be deformable when bent to the position illustrated in FIG. 6 in order to permit flushing of the device of any clogging particles, as described below.

The device illustrated in FIGS. 5 and 6 operates as follows: In the normal use, the device is in its straight-line position illustrated in FIG. 5, so that the fluid applied to one end (e.g. the left end) can pass through the restricted spiral passageway 216 between the outer face of the coil 210 and the outer sleeve 214, but is blocked from passing through the space 218 between the inner face of the coil and the core 212 by the sealing contact of end faces 212b of the core engaging the ends of the coil. Thus, a precise metering of the fluid flow is effected by the spiral passageway 216. However, when it is desired to flush the device of any clogging particles, it is merely bent as shown in FIG. 6, whereupon the outer portion of the end faces 212b at the opposite ends of the annular groove 212a separate from the ends of the coil 210, permitting an increased quantity of fluid to flow along the inner face 218, as well as along the outer face 216, of the coil 210, thereby flushing the device of any clogging particles.

FIG. 7 illustrates a variation wherein the outer member, therein illustrated as a sleeve 314, is deformable in the radial direction; and the inner member, therein illustrated as a solid core 312, is not deformable in the radial direction, so that the outer space 316 is closed-off and the inner spiral passageway 318 is effective to precisely meter the fluid flow through the device.

FIG. 8 illustrates a still further variation wherein the closed spiral coil 410 of wire is of triangular cross-section, rather than of circular cross-section as in the other described embodiments. This produces a spiral passageway 416 of triangular cross-section which meters the fluid flow. The inner face of coil 410 is flush with the outer face of the core 412 such that no passageway is formed between these faces corresponding to the passageways 18, 118, 218 and 318 in the previously described embodiments. The embodiments of FIG. 8 can be made flushable by incorporating it into the arrangement as described above with respect to FIGS. 5 and 6, for example.

It will be appreciated that in all the disclosed embodiments, the restrictor device could also be flushed by pulling one or both ends of the coil outwardly in order to decrease its diameter and/or to open its loops. A second manner of flushing these devices would be to longitudinally compress the outer sleeve, which radially expands it; i.e. it increases its internal diameter and thereby permits flushing.

While the invention has been described with respect to several preferred embodiments, it will be appreciated that many other variations, modifications and applications of the invention may be made within the scope of the invention as defined in the appended claims.

What is claimed is:

1. A fluid flow restrictor device including a spiral passageway defined by a closed spiral coil of wire disposed between an inner member contacting the inner face of the coil and an outer member contacting the outer face of the coil, there being a fluid inlet at one end of the spiral passageway and a fluid outlet at the other end of the spiral passageway, characterized in that the spirals of the coil are in contact with each other and are unbonded to each other such that they define with at least one of said members a spiral passageway of precise cross-sectional area, and in that at least one of said members is resiliently deformable to increase said cross-sectional area of the passageway and thereby to permit flushing the device.

2. The device according to claim 1, wherein one member closes the spiral passageway between it and the respective face of the coil, whereby the spiral passageway of precise cross-sectional area is defined by the other member and the other face of the coil.

3. The device according to claim 1, wherein said inner member comprises an inflatable hollow sleeve closed at one end and open at the opposite end to permit inflation of the sleeve and thereby deformation of its outer face into the inner spiral passageway to close same, deflation of the sleeve opening both of said spiral passageways permitting flushing of the device of any clogging particles.

4. The device according to claim 3, wherein the open end of said inflatable sleeve includes an annular end flange engaging the respective end of the closed spiral coil to block movement of the sleeve longitudinally of the coil upon inflation of the sleeve, said annular end flange being formed with an opening permitting the inletting of the fluid into the inner spiral passageway upon the deflation of the sleeve.

5. The device according to claim 1, wherein said inner member includes a solid core of resilient material.

6. The device according to claim 5, wherein said inner core of resilient material is formed with an annular recess portion for receiving said closed spiral coil, said recess portion being bounded by end faces contacting the ends of the spiral coil to close the passageway between the inner face of the coil and the outer face of the core.

7. The device according to claim 6, wherein said outer member is in the form of a sleeve which is bendable with the inner core to move said end faces bounding the recessed portion of the inner core out of contact with the ends of the spiral coil, to thereby open both of said passageways permitting flushing of the device of any clogging particles.

8. The device according to claim 1, wherein said closed spiral coil is of metal wire.

9. The device according to claim 1, wherein said closed spiral coil is of wire of circular corss-section.

10. The device according to claim 1, wherein said closed spiral coil is of wire of triangular cross-section.

* * * * *